United States Patent
Hammond

(10) Patent No.: US 7,959,047 B2
(45) Date of Patent: *Jun. 14, 2011

(54) FORK CROWN SUPPORTED BICYCLE CARRIER

(76) Inventor: Malcolm T. Hammond, North Vancouver (CA)

( * ) Notice: Subject to any disclaimer, the term of this patent is extended or adjusted under 35 U.S.C. 154(b) by 403 days.

This patent is subject to a terminal disclaimer.

(21) Appl. No.: 11/453,095

(22) Filed: Jun. 15, 2006

(65) Prior Publication Data
US 2006/0237505 A1 Oct. 26, 2006

Related U.S. Application Data

(63) Continuation-in-part of application No. 10/782,174, filed on Feb. 20, 2004.

(51) Int. Cl.
*B60R 11/00* (2006.01)
*B60R 9/00* (2006.01)
(52) U.S. Cl. .......................... 224/521; 224/924
(58) Field of Classification Search .......... 224/488, 224/495, 509, 518–521, 532, 924; 211/17–22
See application file for complete search history.

(56) References Cited

U.S. PATENT DOCUMENTS

| | | | |
|---|---|---|---|
| 4,171,077 A | 10/1979 | Richard, Jr. | |
| 5,067,641 A | 11/1991 | Johnson et al. | |
| 5,211,323 A | 5/1993 | Chimenti et al. | |
| 5,526,971 A | 6/1996 | Despain | |
| 5,558,261 A | 9/1996 | Hedeen | |
| 5,647,521 A | 7/1997 | Burgess | |
| 5,803,330 A | 9/1998 | Stack | |
| 5,871,131 A | 2/1999 | Low et al. | |
| 5,996,870 A * | 12/1999 | Shaver | 224/532 |
| 6,010,049 A | 1/2000 | Stein | |
| 6,123,498 A | 9/2000 | Surkin | |
| 6,435,523 B1 | 8/2002 | Hilk | |
| 6,491,195 B1 | 12/2002 | McLemore et al. | |
| 6,516,986 B1 | 2/2003 | Lassanske et al. | |
| 6,834,786 B2 * | 12/2004 | Hansen | 224/403 |
| 2001/0035446 A1 | 11/2001 | Walstrom | |

FOREIGN PATENT DOCUMENTS

| | | |
|---|---|---|
| DE | 3890700 C2 * | 12/1996 |
| EP | 95548 A2 * | 12/1983 |
| EP | 0721860 A1 | 7/1996 |
| GB | 2327655 | 3/1999 |
| WO | WO 89/01883 | 3/1989 |
| WO | WO 03064214 A1 * | 8/2003 |

* cited by examiner

*Primary Examiner* — Nathan J. Newhouse
*Assistant Examiner* — Corey N Skurdal
(74) *Attorney, Agent, or Firm* — Cameron IP

(57) ABSTRACT

A vehicle mounted bicycle carrier for transporting non-standard bicycle frame types, such as full suspension mountain bikes. The carrier typically is mounted to the hitch structure of a vehicle and is comprised of a vertical support mast, with a top mounted horizontal bar, containing cradles for hanging bicycles from their fork crowns in a vertical position, providing independent access. The cradle design turns the fork and handlebars to a degree that prevents interference with an adjacent bicycle's handlebars, thereby allowing the closest possible spacing. Lower down on the vertical support mast is a horizontal bar for securing the bicycle rear wheels, preventing the bicycles from swinging freely on the cradles.

13 Claims, 11 Drawing Sheets

FORK CROWN SUPPORTED BICYCLE CARRIER

Figure 1:
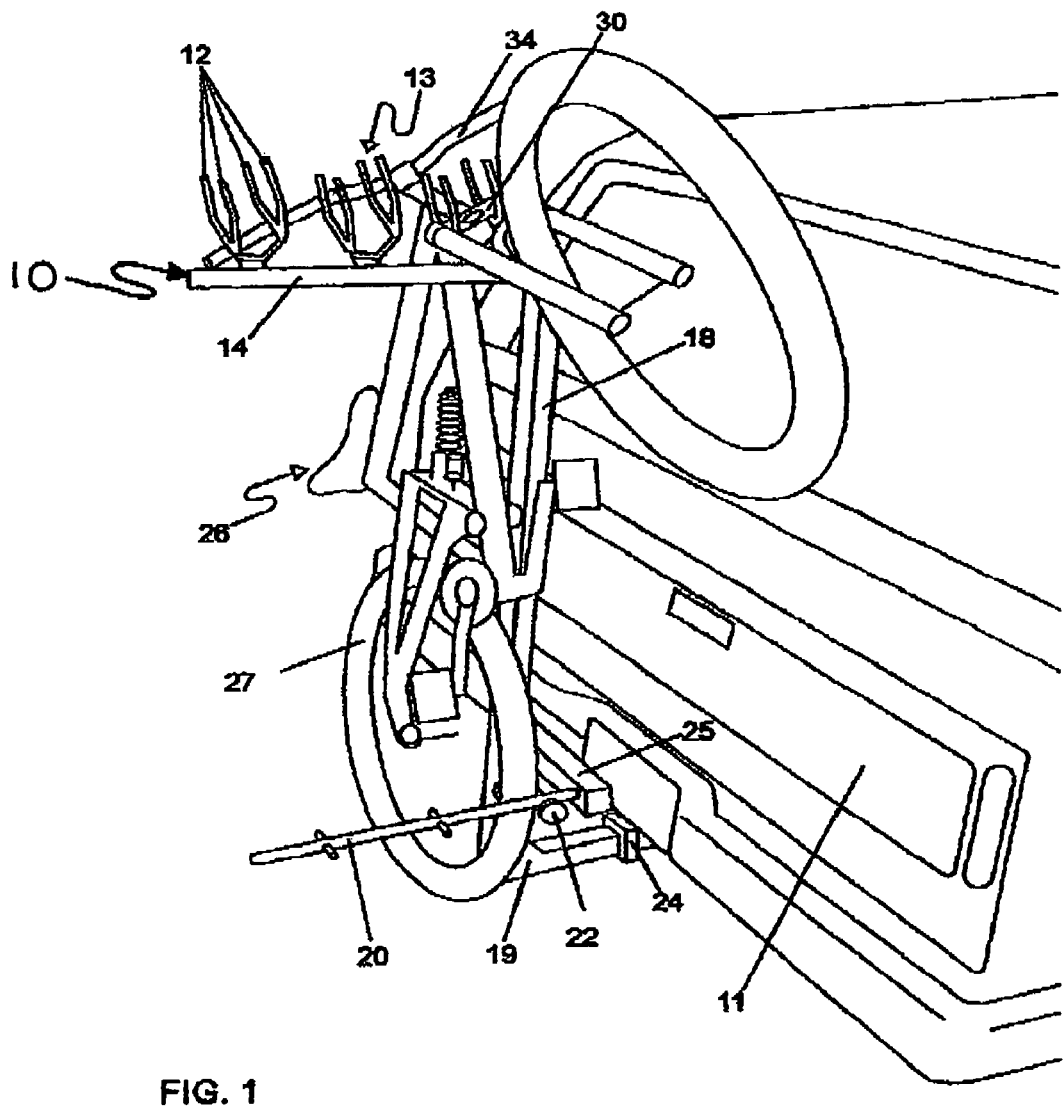

This application is a continuation-in-part of U.S. patent application Ser. No. 10/782,174 filed Feb. 20, 2004.

FIELD OF THE INVENTION

The present invention relates to a bicycle carrier, and particularly to a vehicle mounted bicycle carrier.

BACKGROUND OF THE INVENTION

Bicycles are often transported between locations on carriers attached to vehicles. In many cases, these carriers incorporate an arm or cradle that the top tube of a bicycle rests on or in, to support the bicycle. However, women's bicycles and many newer non-traditional frames, especially full suspension mountain bikes, do not have a top tube. As a result, these types of bicycles cannot be directly mounted on such carriers.

Several bicycle carrier designs aim to overcome this problem. One such design places the bicycle on top of the vehicle by removing the front wheel of the bicycle and clamping the carrier to the exposed ends of the bicycle fork. Problems with this design include the hassle associated with removing the front wheel, and the need to store the wheel elsewhere. Also the bicycle needs to be lifted up high and placed on top of the vehicle. Another carrier design incorporates a surrogate top tube, as disclosed in Hilk, U.S. Pat. No. 6,435,523, issued Aug. 20, 2002, whereby a tube is attached to the handlebars and seat post of a bicycle and the bicycle and attached tube is then affixed to the bicycle carrier. This design requires the user to attach the device to the bicycle in two different places, and then to attach the device to the bicycle carrier, adding greatly to the amount of time needed to attach the bicycle to the vehicle. Yet other carrier designs carry a bicycle behind a vehicle via cradles in which the bicycle wheels sit. This style of bicycle carrier is generally large, complicated, and cumbersome, especially those which carry a plurality of bicycles. Another common design of hitch mounted bicycle carriers simply stack the bicycles on a fork or similar structure, requiring the removal of the outermost bicycles to access the innermost bicycles.

SUMMARY OF THE INVENTION

Several objects and advantages of the present invention include:
a) providing a vehicle mountable bicycle carrier capable of carrying any bicycle regardless of its frame design;
b) providing a vehicle mountable bicycle carrier which is easy to use;
c) providing a vehicle mountable bicycle carrier which carries one or more bicycles without removing any part of any bicycle;
d) providing a vehicle mountable bicycle carrier which carries a plurality of bicycles and does not require the removal of any bicycle to access another bicycle; and
e) providing a vehicle mountable bicycle carrier which is not overly complex and cumbersome.

The present invention provides a vehicle hitch mountable bicycle carrier comprising an upper bar containing cradles made up of paired V shaped tines, in which the crown of a bicycle fork fits. The bicycle hangs from its fork crown in a near vertical orientation, hooked by a cradle on the carrier's upper bar. Furthermore, the cradles are orientated such that the bicycle's front wheel and handlebars are turned to facilitate the close proximity of another bicycle. The rear wheel is affixed to the carrier's lower bar by a hook or other device.

DRAWINGS

Figure 2:
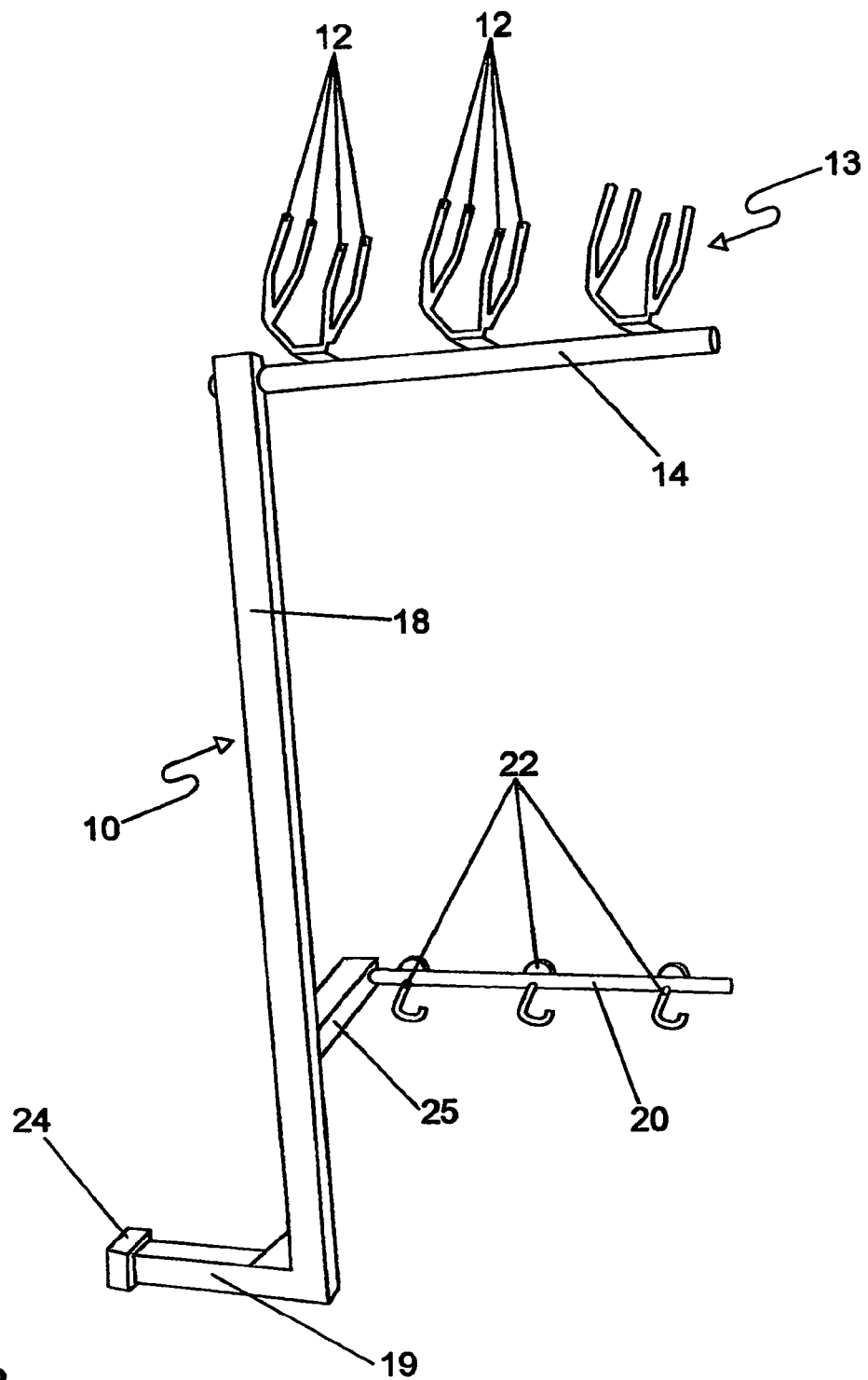
Figure 3:
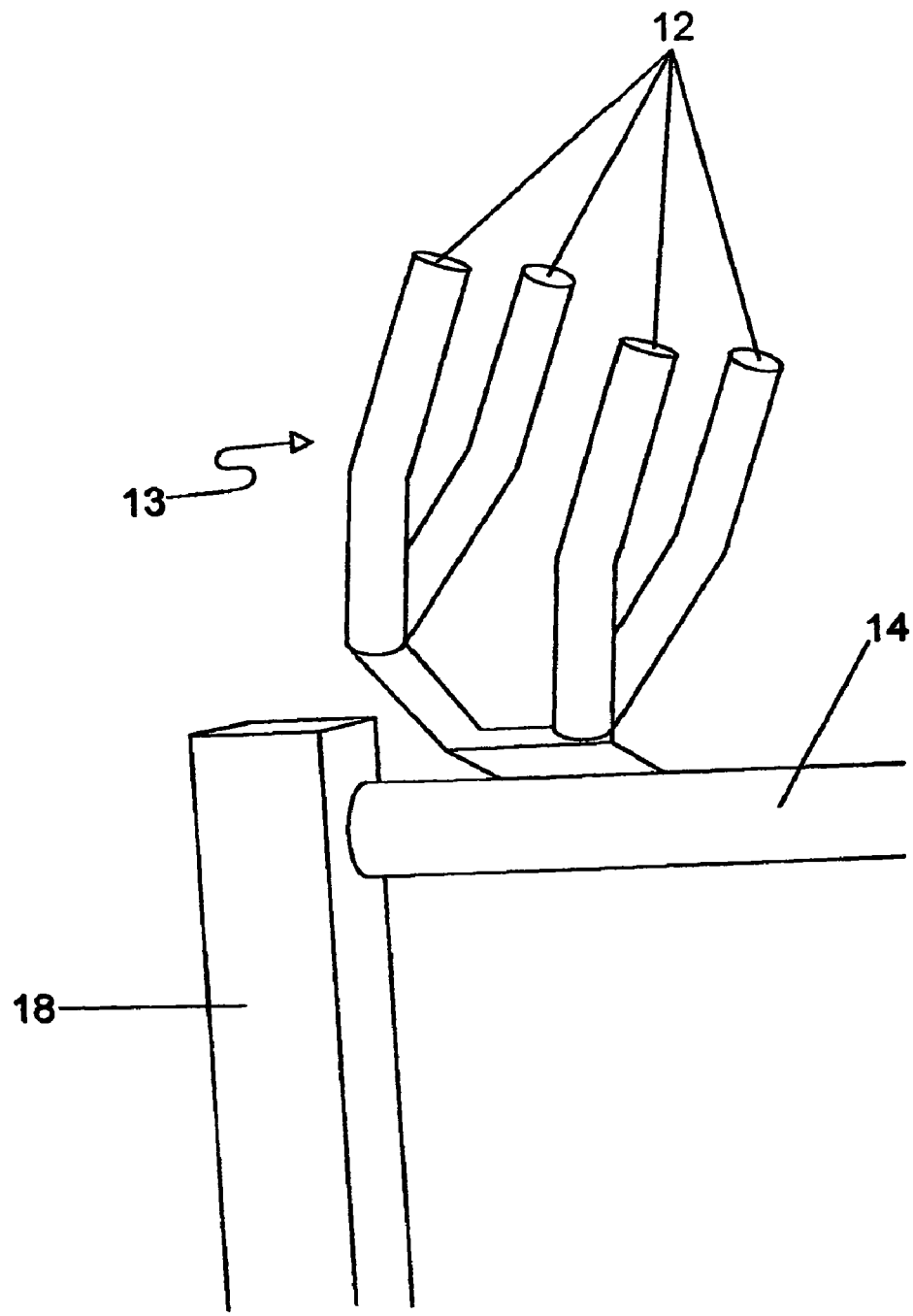
Figure 4:
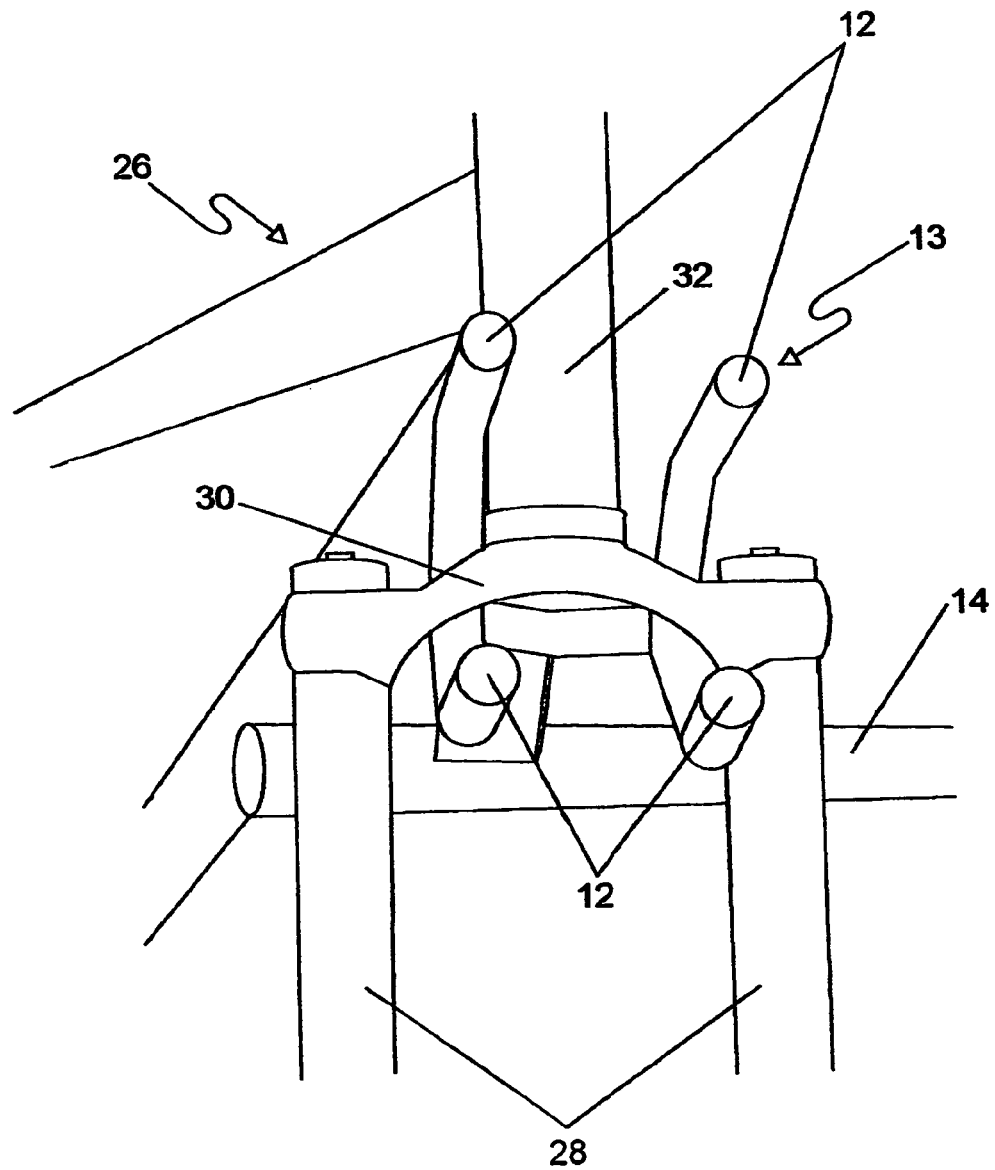
Figure 5:
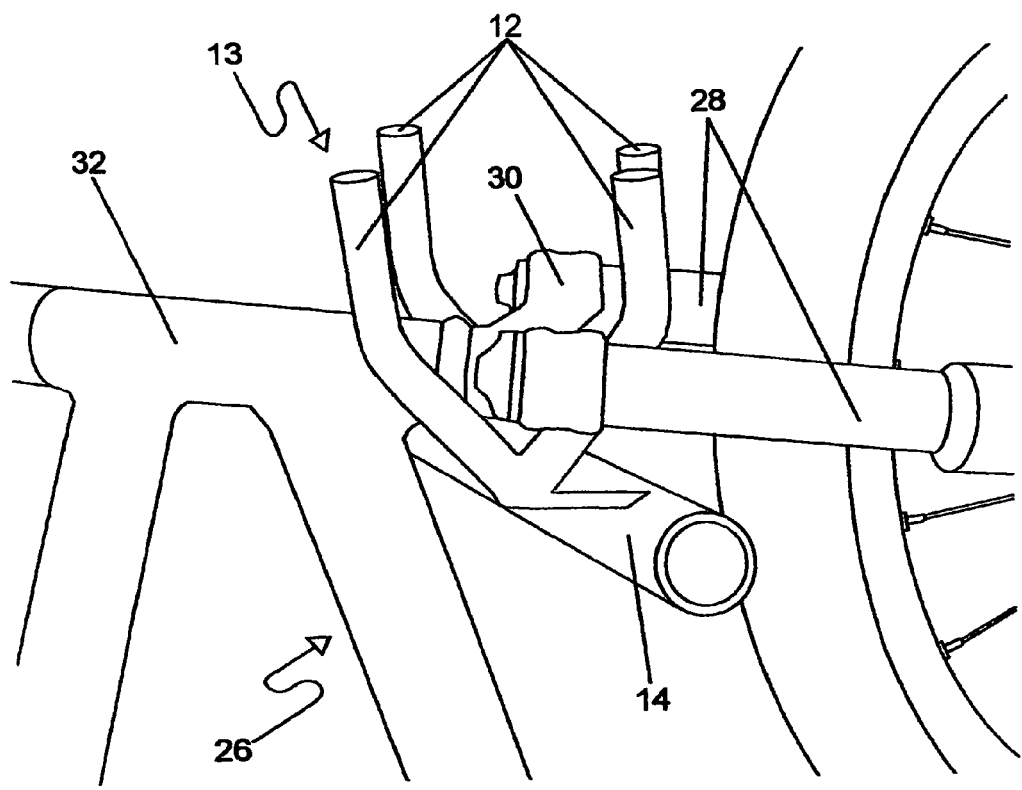
Figure 6:
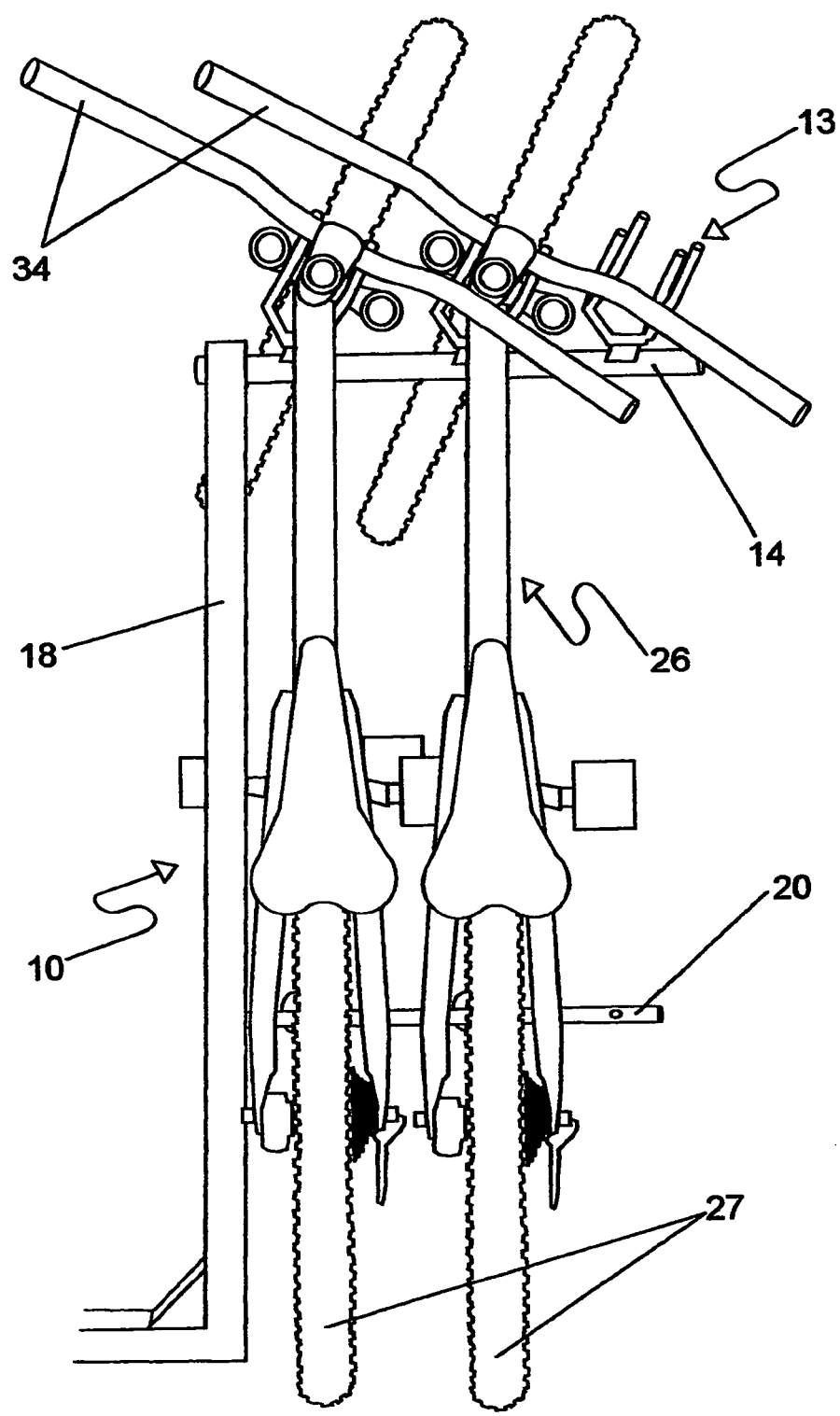
Figure 7:
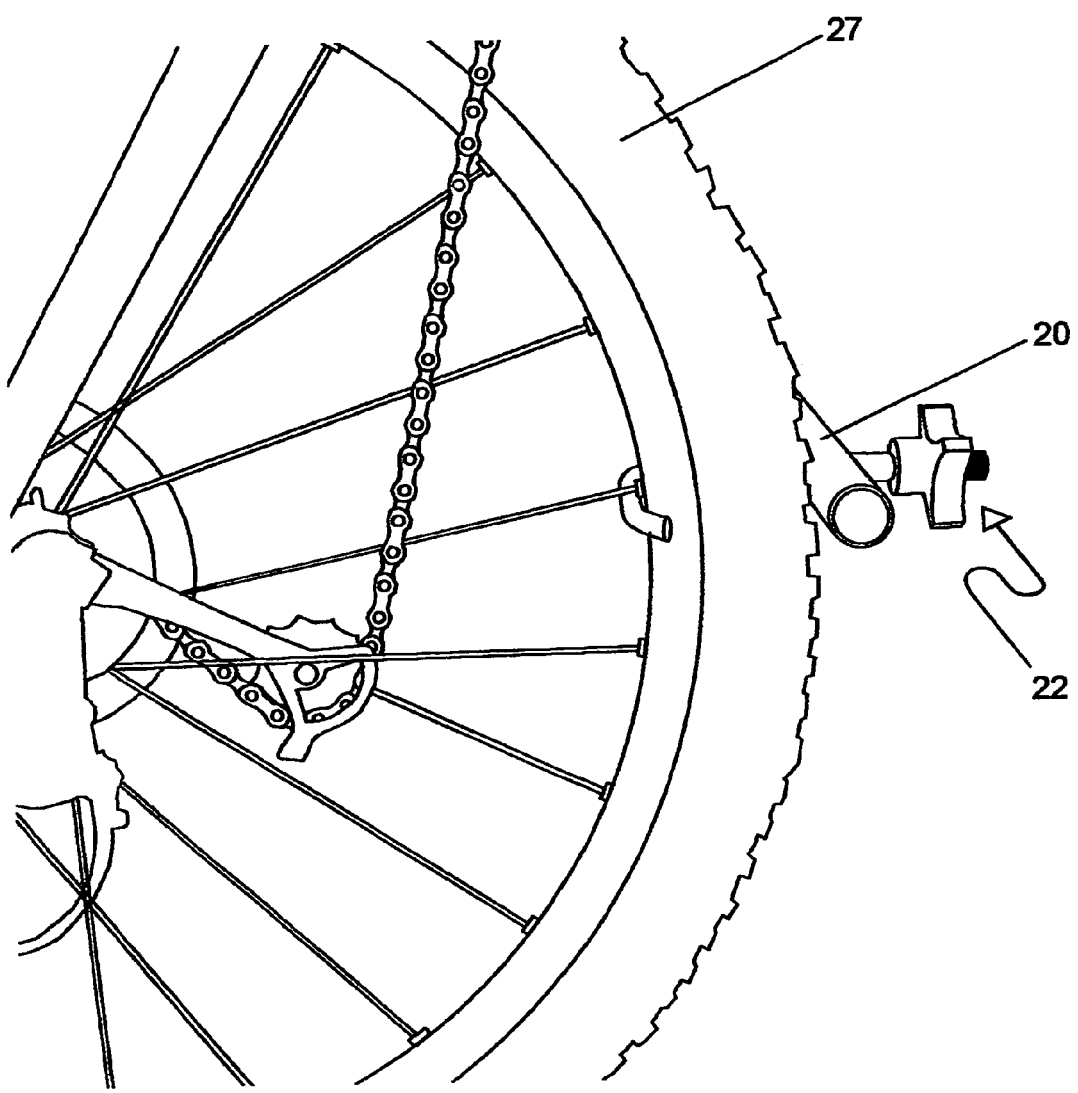
Figure 8:
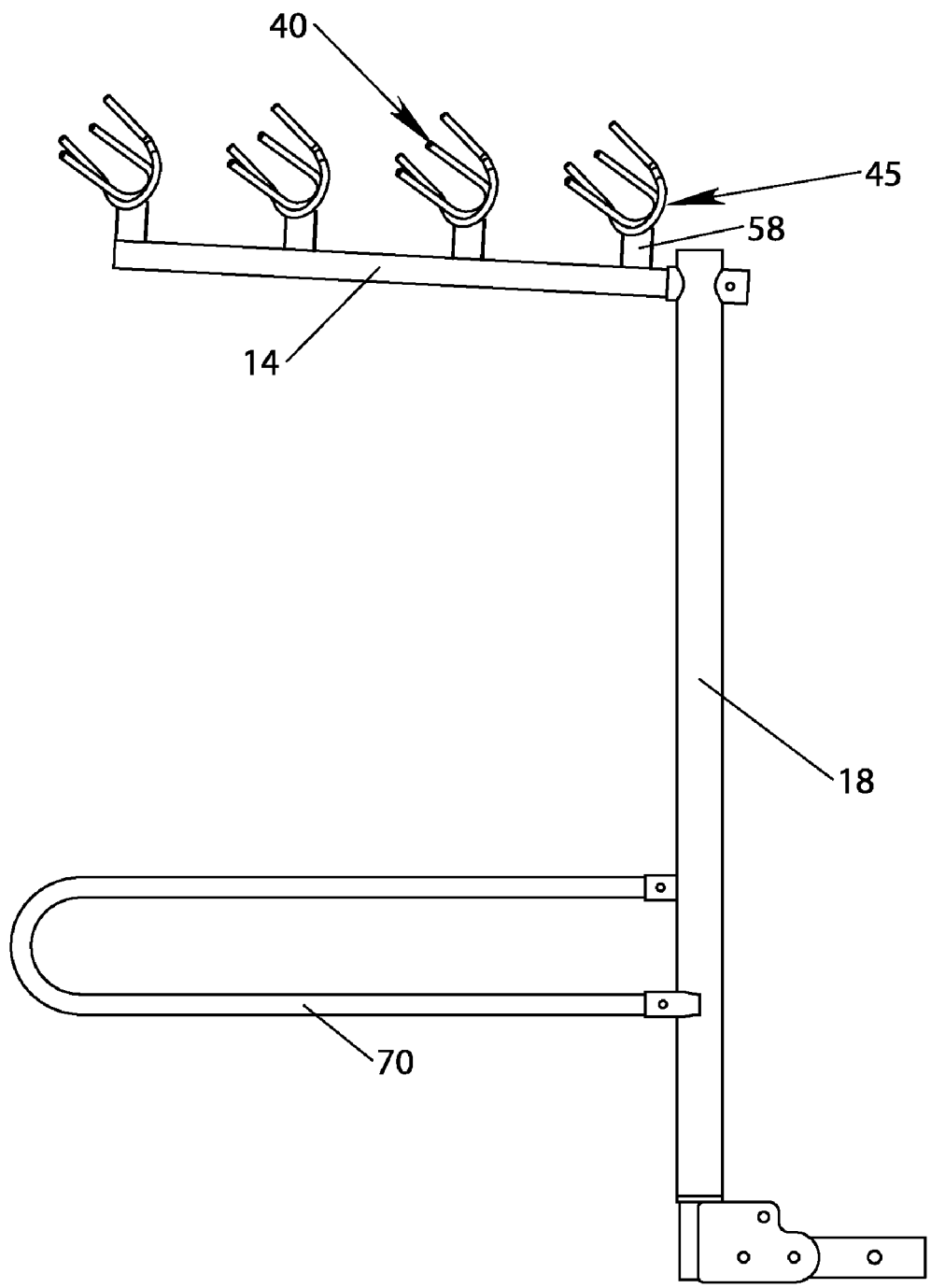
Figure 9:
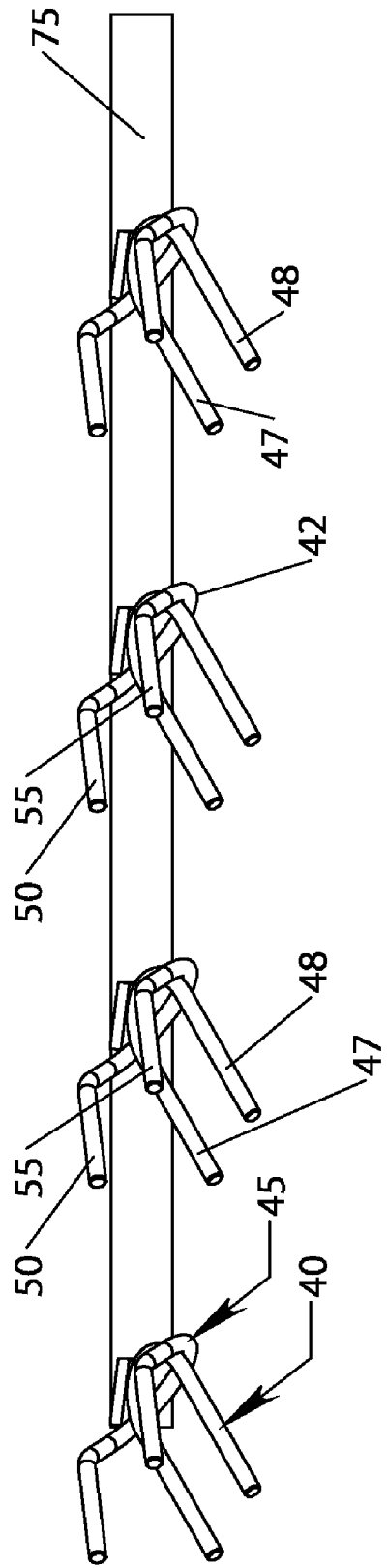
Figure 10:
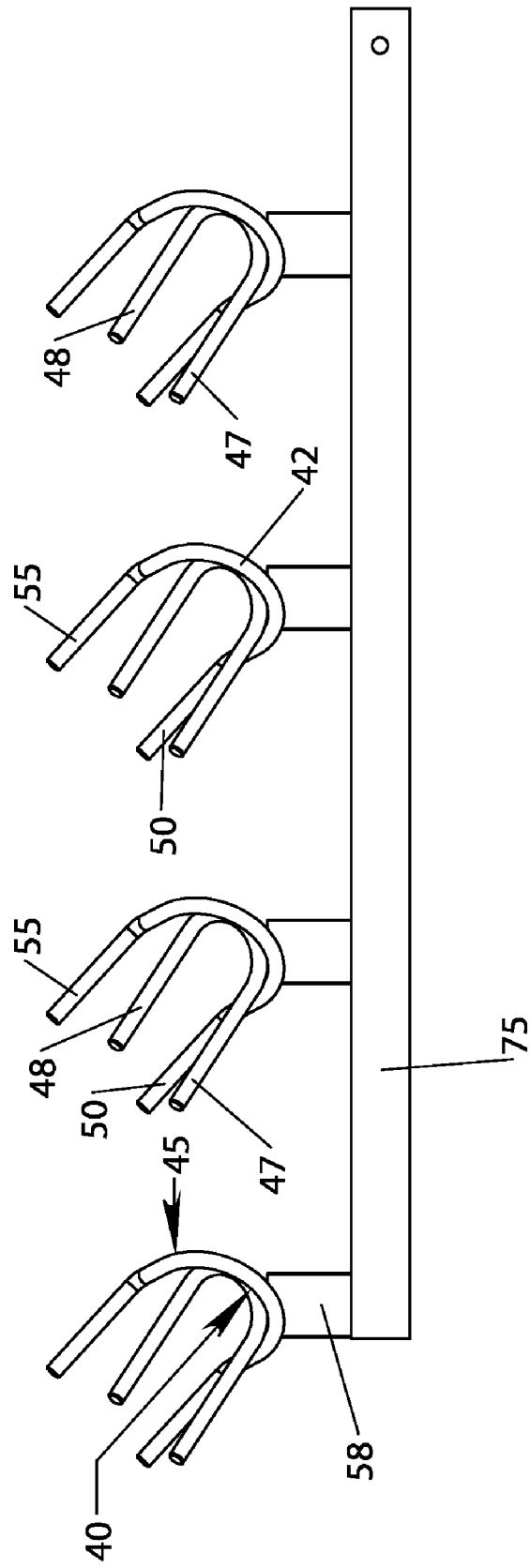
Figure 11:
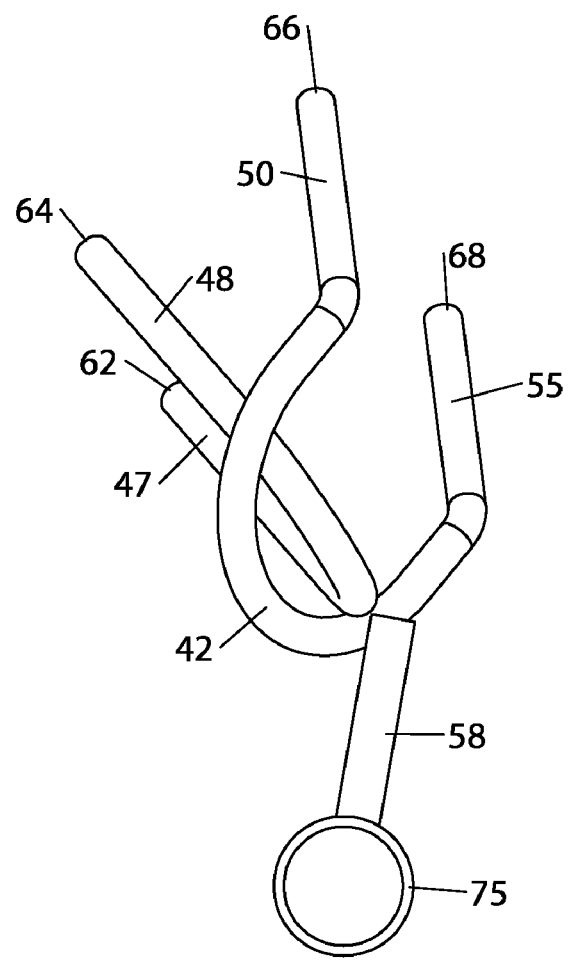

FIG. 1 is a perspective view of the end of a vehicle with a bicycle carrier according to the invention, having a bicycle mounted thereon;
FIG. 2 is a perspective side view of the bicycle carrier thereof;
FIG. 3 is a perspective side view of a fork crown cradle the upper bar thereof;
FIG. 4 is a perspective top view of the fork crown cradle thereof, showing the cradle to bicycle fork crown interface;
FIG. 5 is an end view of a fork crown cradle showing the interface of a bicycle fork crown and the cradle;
FIG. 6 is a side view of the bicycle carrier showing how the angled mounting of the bicycle handlebars facilitates the close proximity of the bicycles;
FIG. 7 is a side view of a bicycle rear wheel secured to the rear wheel stabilizer bar of the bicycle carrier by a J-hook and knob device;
FIG. 8 is a perspective view of an alternative embodiment of a bicycle carrier according to the invention;
FIG. 9 is a top view of the upper bar and cradle thereof;
FIG. 10 is a side view thereof; and
FIG. 11 is an end view thereof.

DETAILED DESCRIPTION OF THE PREFERRED EMBODIMENT

In the drawings, the following numerals represent the following components:

| Reference Numeral | Component |
| --- | --- |
| 10 | bicycle carrier |
| 11 | vehicle |
| 12 | tines |
| 13 | fork crown cradle |
| 14 | horizontal upper bar |
| 18 | vertical support mast |
| 19 | hitch attachment bar |
| 20 | rear wheel horizontal stabilizer bar |
| 22 | J-hook and knob |
| 24 | vehicle hitch structure |
| 25 | stabilizer offset tube |
| 26 | bicycle |
| 27 | bicycle rear wheel |
| 28 | bicycle fork tubes |
| 30 | bicycle fork crown |
| 32 | bicycle head tube |
| 34 | handlebars |
| 40 | inside tine |
| 42 | tine base |
| 45 | outside tine |
| 47 | tine arm |
| 48 | tine arm |
| 50 | raised arm |
| 55 | raised arm |
| 58 | attachment member |
| 62 | free distal end |
| 64 | free distal end |
| 66 | free distal end |
| 68 | free distal end |
| 70 | support member |
| 75 | upper horizontal bar |

Referring to FIG. 1, the bicycle carrier 10 according to the invention is shown mounted to the rear of a vehicle 11 for the convenient transport of at least one bicycle 26. In a preferred embodiment bicycle carrier 10 is attached to vehicle 11 through hitch structure 24 substantially mounted to vehicle 11. Bicycles 26 are securable to bicycle carrier 10 for transport by vehicle 11 and subsequent removal and use at the destination.

FIG. 2 shows bicycle carrier 10 attached to vehicle hitch structure 24. The preferred embodiment of bicycle carrier 10 has a horizontal upper bar 14 with a plurality of cradles (referred to herein as fork crown cradles 13), attached to horizontal upper bar 14. In a preferred embodiment, each fork crown cradle 13, as shown in FIG. 3, is comprised of four tines 12 approximately five inches in length, arranged into two V-shaped structures, with a V angle of approximately seventy degrees, spaced approximately four inches apart, and with about the top half of tines 12 being parallel. The fork crown cradles 13 can be set at an angle between zero and ninety degrees from the longitudinal axis of the horizontal upper bar 14.

In the embodiment shown in FIG. 1 and FIG. 2 the fork crown cradles 13 are at an angle of approximately forty-five degrees from the longitudinal axis of the horizontal upper bar 14. Each fork crown cradle 13 is spaced at a distance from an adjacent fork crown cradle 13 to allow the closest possible proximity of another bicycle, about seven inches in a preferred embodiment. The horizontal upper bar 14, best shown in FIG. 2, is attached to vertical support mast 18, and the lowermost end of vertical support mast 18 is affixed to hitch attachment bar 19. Hitch attachment bar 19 is simply slid into a receiver style vehicle hitch structure 24, thereby positioning horizontal upper bar 14 at an approximate right angle to the bumper of vehicle 11.

Other means of attaching bicycle carrier 10 to vehicle 11 are available, including the use of a strap system (possibly in combination with hooks) or by connecting bicycle carrier 10 to a roof mount.

At a point on vertical support mast 18 located approximately one bicycle wheelbase length down from horizontal upper bar 14, is rear wheel horizontal stabilizer bar 20. Preferably, rear wheel horizontal stabilizer bar 20 is offset to the right by approximately one half of a bicycle wheel diameter, as viewed from behind, by stabilizer offset tube 25. Spaced approximately equidistant on rear wheel stabilizer bar 20 and centered with respect to fork crown cradles 13 on the horizontal upper bar 14, are J-hook and knob devices 22. The J-hook and knob devices 22 are simply hooks with threads and a knob on the non-hooked end, which pass through holes in the rear wheel stabilizer bar 20, and are used to secure a bicycle rear wheel, as seen in FIG. 7.

FIG. 3, FIG. 4 and FIG. 5 are views of a fork crown cradle 13 comprised of one pair of V shaped paired tines 12. FIG. 4 is an overhead view of one fork crown cradle 13, showing the bicycle fork crown 30 and the bicycle head tube 32, contained within the fork crown cradle 13 and showing the bicycle fork tubes 28 running outboard of the tines 12, and the bicycle head tube 32 running inboard of the tines 12. As viewed in FIG. 5, the bicycle fork crown 30 is placed between the two leftmost and two rightmost tines 12.

As shown in FIG. 6 the close mounting of adjacent bicycles 26 is facilitated by the fork crown cradles 13 being set at an angle of approximately forty-five degrees from the horizontal upper bar 14. This angle inherently turns the bicycle fork and most importantly the handlebars 34 to approximately the same angle, thereby eliminating interference with another bicycle's handlebars, mounted to an adjacent fork crown cradle 13.

FIG. 7 shows how the rear wheel of the bicycle 27 is secured against the rear wheel stabilizer bar 20 by a J-hook and knob device 22. This device consists of a hooked metal rod mounted through a hole in the rear wheel stabilizer bar 20. The straight end is threaded with a knob attached. The rear wheel of the bicycle is simply hooked by the J-hook and tightened against the rear wheel stabilizer bar 20 by the knob.

Alternative embodiments of fork crown cradle and tines may be used in association with the invention. For example, in an alternative embodiment of the invention, as seen in FIGS. 8, 9, 10 and 11, each pair of tines 40 and 45 is interlayer. As seen in FIG. 10, inside tine pair 40 forms a U shape and is secured to attachment member 58 such that lower arm 47 of inside tine pair 40 is at an approximate forty-five degree angle to horizontal upper bar 14.

In the alternative embodiment, raised arms 50, 55 of outside tine pair 45 are positioned adjacent to, but outside arms 47, 48 of inside tine pair 40. Outside tine pair 45 includes a U shaped base 42, and raised arms 50, 55. U shaped base 42 is secured to lower arm 47. Each of the arms 47, 48, 50 and 55 has a corresponding free distal end 62, 64, 66 and 68. The tine arrangement of the alternative embodiment is structurally simple and operates in the same manner as fork crown cradle 13 and are compatible with most styles of bicycle forks. They also may be simpler to manufacture than the tines of the earlier described embodiment.

In the alternative embodiment, as seen in FIG. 8, a generally U shaped support member 70 extends horizontally from support mast 18 and meets support mast 18 at two points. Support member 70, when in use, prevents the rear wheel 27 of bicycle 26 from riding up and over upper horizontal bar 75 thereby preventing bicycle 26 from moving upwards and off tines 40, 45. The upper horizontal bar 75 of support member 70 functions in a similar manner as a wheel chock.

The reader will see that the bicycle carrier of this invention can be used to transport, by vehicle, any bicycle with a front fork, encompassing virtually all known bicycle designs. The carrier design allows the quick and convenient loading and unloading of bicycles, without the need to remove any bicycle to access another. Furthermore the design provides an efficient way to carry as many bicycles as possible, in as little space as possible, by turning the handlebars, thereby preventing interference.

I claim:

1. A bicycle carrier for receiving a fork crown of a bicycle, the bicycle carrier comprising:
    a support mast;
    a hitch attachment bar extending generally perpendicular from the support mast adjacent a first end thereof;
    an elongate support member extending generally perpendicular from the support mast adjacent a second end thereof;
    a substantially U-shaped support member extending generally perpendicular from the support mast and generally parallel to the elongate support member, the U-shaped support member being disposed between the hitch attachment bar and the elongate support member, and the U-shaped member being positioned and configured to stabilize a rear wheel of the bicycle by functioning as a wheel chock to prevent the rear wheel from riding over the U-shaped support; and
    a cradle disposed along the elongate support member, the cradle including four rods, wherein each of the rods extends away from the elongate support member and said each of the rods has a free distal end, a first pair of the rods forming a U-shape structure and a second pair of the rods forming a U-shaped base from which the rods thereof further extend angularly as arms towards the distal end of the said rods the second pair of rods being connected to and extending from at least one rod of the first pair of rods so as to allow the fork crown to be received between the first pair of rods, whereby the first pair of rods is disposed between fork tubes of the bicycle and a head tube of the bicycle is disposed between the second pair of rods.

2. A bicycle carrier as claimed in claim 1 wherein the arms are parallel.

3. A bicycle carrier as claimed in claim 1 wherein the arms are disposed adjacent to but outside the first pair of rods.

4. A bicycle carrier as claimed in claim 1 further including an attachment member extending between the elongate support member and the first pair of rods.

5. A bicycle carrier as claimed in claim in 1 wherein at least one rod of the first pair of rods extends at a forty-five degree angle relative to elongate support member.

6. A bicycle carrier as claimed in claim 1 further including a plurality of cradles disposed along the elongate support member.

7. A bicycle carrier as claimed in claim 1 wherein the U-shaped support member is connected to the support mast at two points.

8. A bicycle carrier having a support mast, an elongate support member extending from the support mast and cradle disposed along the elongate support member, the cradle being for receiving a crown fork of a bicycle and the cradle comprising:
    a first pair of rods forming a U-shape structure; and
    a second pair of rods forming a U-shaped base from which the rods thereof further extend angularly as arms towards the distal end of the said rods;
    wherein each of the rods extends away from the elongate support member and each of the rods has a free distal end, the second pair of rods being connected to and extending from at least one rod of the first pair of rods so as to allow the fork crown to be received between the first pair of rods, whereby the first pair of rods is disposed between fork tubes of the bicycle and a head tube of the bicycle is disposed between the second pair of rods.

9. A bicycle carrier as claimed in claim 8 wherein the arms are parallel.

10. A bicycle carrier as claimed in claim 8 wherein the arms are disposed adjacent to but outside the first pair of rods.

11. A bicycle carrier as claimed in claim 8 further including an attachment member extending between the elongate support member and the first pair of rods.

12. A bicycle carrier as claimed in claim in 8 wherein at least one tine of the first pair of rods extends at a forty-five degree angle relative to elongate support member.

13. A bicycle carrier for receiving a fork crown of a bicycle, the bicycle carrier comprising:
    a support mast;
    a hitch attachment bar extending generally perpendicular from the support mast adjacent a first end thereof;
    an elongate support member extending generally perpendicular from the support mast adjacent a second end thereof;
    a substantially U-shaped support member extending generally perpendicular from the support mast and generally parallel to the elongate support member, the U-shaped support member being disposed between the hitch attachment bar and the elongate support member, and the U-shaped member being positioned and configured to stabilize a rear wheel of the bicycle by functioning as a wheel chock to prevent the rear wheel from riding over the U-shaped support; and
    a cradle disposed along the elongate support member, the cradle including a base and four rods extending from the base, each of the rods having a free distal end and each of the rods extending away from the elongate support member towards the distal end of the rods, a first and a second of the rods extending generally parallel to one another, a third and a fourth of the rods each having a portion extending non-parallel to the base and a further portion extending as an arm towards the distal end of said each third and fourth of the rods, the first and second of the rods being spaced-apart from the arms of the third and fourth of the rods so as to allow the crown fork to be received by the cradle, whereby the first and second of the rods are disposed between fork tubes of the bicycle and a head tube of the bicycle is disposed between said arms of the third and fourth of the rods.

\* \* \* \* \*

UNITED STATES PATENT AND TRADEMARK OFFICE
CERTIFICATE OF CORRECTION

| | | |
|---|---|---|
| PATENT NO. | : 7,959,047 B2 | Page 1 of 1 |
| APPLICATION NO. | : 11/453095 | |
| DATED | : June 14, 2011 | |
| INVENTOR(S) | : Malcolm Hammond | |

It is certified that error appears in the above-identified patent and that said Letters Patent is hereby corrected as shown below:

Column 4, line 43 - Column 5, line 6,
Claim 1 should be amended as shown below. In the issued patent the "," on the fourth last line of claim 1 as shown below between "said rods, the second pair" is missing.

1. A bicycle carrier for receiving a fork crown of a bicycle, the bicycle carrier comprising:

a support mast;

a hitch attachment bar extending generally perpendicular from the support mast adjacent a first end thereof;

an elongate support member extending generally perpendicular from the support mast adjacent a second end thereof;

a substantially U-shaped support member extending generally perpendicular from the support mast and generally parallel to the elongate support member, the U-shaped support member being disposed between the hitch attachment bar and the elongate support member, and the U-shaped member being positioned and configured to stabilize a rear wheel of the bicycle by functioning as a wheel chock to prevent the rear wheel from riding over the U-shaped support; and a cradle disposed along the elongate support member, the cradle including four rods, wherein each of the rods extends away from the elongate support member and said each of the rods has a free distal end, a first pair of the rods forming a U-shape structure and a second pair of the rods forming a U-shaped base from which the rods thereof further extend angularly as arms towards the distal end of the said rods, the second pair of rods being connected to and extending from at least one rod of the first pair of rods so as to allow the fork crown to be received between the first pair of rods, whereby the first pair of rods is disposed between fork tubes of the bicycle and a head tube of the bicycle is disposed between the second pair of rods.

Signed and Sealed this
Sixteenth Day of August, 2011

David J. Kappos
*Director of the United States Patent and Trademark Office*